(12) United States Patent
Seki

(10) Patent No.: US 8,101,538 B2
(45) Date of Patent: Jan. 24, 2012

(54) PROCESS FOR PRODUCING RUTHENIUM OXIDE-SUPPORTED MATERIAL AND PROCESS FOR PRODUCING CHLORINE

(75) Inventor: Kohei Seki, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/515,352

(22) PCT Filed: Nov. 22, 2007

(86) PCT No.: PCT/JP2007/073132
§ 371 (c)(1),
(2), (4) Date: Jun. 3, 2009

(87) PCT Pub. No.: WO2008/069114
PCT Pub. Date: Jun. 12, 2008

(65) Prior Publication Data
US 2010/0068126 A1    Mar. 18, 2010

(30) Foreign Application Priority Data

Nov. 27, 2006 (JP) ................................ 2006-318303

(51) Int. Cl.
*B01J 23/00* (2006.01)
*B01J 21/00* (2006.01)
*B01J 20/00* (2006.01)

(52) U.S. Cl. ......... 502/242; 502/261; 502/350; 502/439

(58) Field of Classification Search .................. 502/242, 502/261, 350, 439
See application file for complete search history.

(56) References Cited

U.S. PATENT DOCUMENTS

| 4,766,101 | A | | 8/1988 | Nortier et al. | |
| 4,794,099 | A | * | 12/1988 | Iglesia et al. | 502/241 |
| 5,162,283 | A | * | 11/1992 | Moini | 502/236 |
| 5,272,125 | A | * | 12/1993 | Weible et al. | 502/242 |
| 5,466,835 | A | * | 11/1995 | Nemeth et al. | 502/242 |
| 5,587,349 | A | * | 12/1996 | Abe et al. | 502/236 |
| 5,840,650 | A | * | 11/1998 | Tamura et al. | 502/350 |
| 5,871,707 | A | | 2/1999 | Hibi et al. | |
| 6,117,814 | A | * | 9/2000 | Plecha et al. | 502/325 |
| 6,235,677 | B1 | * | 5/2001 | Manzer et al. | 502/232 |
| 6,323,147 | B1 | * | 11/2001 | Yamamoto et al. | 502/64 |
| 6,372,687 | B1 | * | 4/2002 | Hagemeyer et al. | 502/326 |
| 6,479,427 | B1 | * | 11/2002 | Anthony et al. | 502/242 |
| 6,491,886 | B1 | * | 12/2002 | Hedouin et al. | 423/239.1 |
| 6,673,739 | B2 | * | 1/2004 | Yamazaki et al. | 502/216 |
| 6,838,570 | B2 | * | 1/2005 | Yamamoto et al. | 549/529 |
| 6,852,667 | B2 | | 2/2005 | Hibi et al. | |
| 6,956,006 | B1 | * | 10/2005 | Mirsky et al. | 502/236 |
| 7,288,237 | B2 | * | 10/2007 | Le-Khac | 423/326 |
| 7,358,211 | B2 | * | 4/2008 | Eng | 502/326 |
| 7,510,994 | B2 | * | 3/2009 | Ikeda et al. | 502/327 |
| 7,601,670 | B2 | * | 10/2009 | Yasuda et al. | 502/326 |
| 7,629,287 | B2 | * | 12/2009 | Siler et al. | 502/242 |
| 7,659,224 | B2 | * | 2/2010 | Shimazaki et al. | 502/180 |
| 7,674,744 | B2 | * | 3/2010 | Shiratori et al. | 502/327 |
| 7,713,906 | B2 | * | 5/2010 | Blankenstein et al. | 502/242 |
| 7,820,583 | B2 | * | 10/2010 | Fu et al. | 502/209 |
| 7,863,216 | B2 | * | 1/2011 | Obayashi et al. | 502/261 |
| 2006/0147366 | A1 | | 7/2006 | Kogoi et al. | |
| 2007/0112209 | A1 | * | 5/2007 | Le-Khac | 549/533 |
| 2008/0249340 | A1 | * | 10/2008 | Siler et al. | 568/952 |
| 2009/0118119 | A1 | * | 5/2009 | Ratnasamy et al. | 502/303 |

FOREIGN PATENT DOCUMENTS

| JP | 4-29417 B2 | 5/1992 |
| JP | 11-197513 A | 7/1999 |
| JP | 2000-254493 A | 9/2000 |
| JP | 2002-292279 A | 10/2002 |
| JP | 2003-80067 A | 3/2003 |
| JP | 2004-74073 A | 3/2004 |
| JP | 2004-210586 A | 7/2004 |
| JP | 2004-237215 A | 8/2004 |
| JP | 2005-219959 A | 8/2005 |

OTHER PUBLICATIONS

Chinese Office Action issued on Jul. 21, 2011 in corresponding Chinese Patent Application No. 200780043157.0 with its English translation.
Japanese Office Action dated Oct. 18, 2011 for Japanese Application No. JP 2007-253863.

* cited by examiner

*Primary Examiner* — Cam N. Nguyen
(74) *Attorney, Agent, or Firm* — Birch, Stewart, Kolasch & Birch, LLP

(57) ABSTRACT

There are disclosed a process for producing a ruthenium oxide-supported material, characterized in that a ruthenium compound is supported on a titania carrier in which silica is supported on titania, and the obtained material is then calcined under an atmosphere of an oxidizing gas; and a process for producing chlorine by oxidizing hydrogen chloride with oxygen in the presence of the ruthenium oxide-supported material produced by the above-described process.

10 Claims, No Drawings

PROCESS FOR PRODUCING RUTHENIUM OXIDE-SUPPORTED MATERIAL AND PROCESS FOR PRODUCING CHLORINE

TECHNICAL FIELD

The present invention relates to a process for producing a ruthenium oxide-supported material in which ruthenium oxide is supported on a carrier. The present invention also pertains to a process for producing chlorine by oxidizing hydrogen chloride with oxygen, using as a catalyst the ruthenium oxide-supported material produced by this process.

BACKGROUND ART

A ruthenium oxide-supported material is useful as a catalyst for use in production of chlorine by oxidizing hydrogen chloride with oxygen. For example, U.S. Pat. No. 5,871,707 discloses a process for producing a ruthenium oxide-supported material, and this process comprises the steps of allowing a carrier to support a ruthenium compound, specifically a titanium oxide or a composite oxide of titanium oxide and zirconium oxide, and then calcining it in an air.

U.S. Pat. No. 6,852,667 discloses a process for producing a ruthenium oxide-supported material, and this process comprises the steps of allowing a titanium oxide carrier to support a ruthenium compound thereon, reducing the ruthenium compound on the carrier, with hydrazine, sodium borohydride or the like, and oxidizing it, or specifically calcining it in an air. WO01/10550 discloses a process for producing a ruthenium oxide-supported material, and this process comprises the steps of allowing a titanium oxide carrier to support a ruthenium compound thereon, calcining the ruthenium compound on the carrier, and treating it with hydrazine, and oxidizing it, or specifically calcining it in an air.

Further, JP-A-2002-292279 and JP-A-2004-074073 disclose processes for producing ruthenium oxide-supported materials, and each process comprises the steps of allowing a titanium oxide carrier to support a ruthenium compound thereon, calcining the ruthenium compound on the carrier, allowing it to support thereon a silicon compound such as an alkoxysilane compound or a siloxane compound, and oxidizing it, or specifically calcining it in an air.

DISCLOSURE OF THE INVENTION

However, any of the ruthenium oxide-supported materials produced by the processes described in the above-described publications has not a satisfactory lifetime as a catalyst. This is because, when the ruthenium oxide-supported material is subjected to a thermal load such as an oxidization reaction for a long time, the carrier or the ruthenium oxide supported on the carrier tends to sinter, and such sintering causes the catalytic deactivation of such a material.

An object of the present invention is therefore to provide a process for producing a ruthenium oxide-supported material capable of preventing such sintering and excellent in thermal stability and catalytic lifetime. Another object of the invention is to provide a process for stably producing chlorine for a long time, using the ruthenium oxide-supported material obtained by this process.

The present invention provides a process for producing a ruthenium oxide-supported material characterized in that a ruthenium compound is supported on a titania carrier which is prepared by supporting silica thereon on the titania, and the obtained material is then calcined under an atmosphere of an oxidizing gas.

According to the present invention, there is also provided a process for producing chlorine by oxidizing hydrogen chloride with oxygen in the presence of the ruthenium oxide-supported material produced by the above-described process.

According to the present invention, a ruthenium oxide-supported material excellent in thermal stability and catalytic life can be produced, and chlorine can be produced by oxidizing hydrogen chloride with oxygen, using the resultant ruthenium oxide-supported material as a catalyst.

MODES FOR CARRYING OUT THE INVENTION

Hereinafter, the present invention will be described in detail. In the present invention, a titania carrier obtained by supporting silica on the titania is used. Such a titania carrier may comprise a rutile titania (titania having a rutile crystalline structure), an anatase titania (titania having an anatase crystalline structure), an amorphous titania or the like, or a mixture thereof. In the present invention, a titania carrier comprising a rutile titania and/or an anatase titania is preferably used. Above all, there is preferably used a titania carrier comprising a rutile titania and/or an anatase titania wherein the ratio of the rutile titania to total of the rutile titania and the anatase titania in the titania carrier (hereinafter optionally referred to as a rutile titania ratio) is preferably 20% or more, more preferably 30% or more, still more preferably 90% or more. A higher rutile titania ratio induces a more improved catalytic activity in the resultant ruthenium oxide-supported material. The above-described rutile titania ratio can be measured by the X-ray diffraction method (hereinafter referred to as XRD method) and can be calculated by the following equation (1):

$$\text{Rutile titania ratio } [\%] = [I_R/(I_A+I_R)] \times 100 \quad (1)$$

$I_R$: the intensity of a diffracted line indicating a plane (101) of a rutile titania $I_A$: the intensity of a diffracted line indicating a plane (101) of an anatase titania When the titania carrier contains sodium and calcium, the catalytic activity of the resultant ruthenium oxide-supported material tends to be lower, as their contents become larger. Therefore, the sodium content is preferably 200 ppm by weight or less, and the calcium content is preferably 200 ppm by weight or less. An alkali metal other than sodium or an alkali earth metal other than calcium, if contained in the titania carrier, is likely to give a negative influence on the catalytic activity of the resultant ruthenium oxide-supported material. Accordingly, the content of all the alkali metals is more preferably 200 ppm by weight or less, and the content of all the alkali earth metals is more preferably 200 ppm by weight or less. The contents of the alkali metals and the alkali earth metals can be measured, for example, by an inductively coupled high frequency plasma emission spectral analysis (hereinafter optionally referred to as ICP analysis), an atomic absorption analysis, an ion chromatographic analysis or the like, and the contents thereof are preferably measured by the ICP analysis. The titania carrier may contain an oxide such as alumina, zirconia or niobium oxide.

The specific surface area of the titania carrier can be measured by the nitrogen adsorption method (the BET method), and is usually measured by the BET single-point determination. The specific surface area of the titania carrier found by the measurement is usually from 5 to 300 m²/g, preferably from 5 to 50 m²/g. When the specific surface area is too large, titania and ruthenium oxide of the resultant ruthenium oxide-supported material tend to sinter, and thus, the thermal stability of the ruthenium oxide-supported material may become lower. On the other hand, when the specific surface area is too small, ruthenium oxide of the resultant ruthenium oxide-supported material becomes hard to disperse, which may lead to a poor catalytic activity.

The titania carrier to be used in the present invention is obtained by previously allowing titania to support silica thereon. For example, such a titania carrier is prepared by supporting a silicon compound on the titania, and calcining it under an atmosphere of an oxidizing gas; or otherwise, such a titania carrier is prepared by subjecting, to a heat treatment, a titanium halide such as titanium chloride ($TiCl_4$) or titanium bromide ($TiBr_4$) and a silicon halide such as silicon chloride ($SiCl_4$) or silicon bromide ($SiBr_4$), under an atmosphere of an oxidizing gas.

When a silicon compound is supported on titania, the titania in the form of powder or a sol may be kneaded and formed and calcined for use. The calcined titania may be prepared by a known method: for example, titania powder or sol is kneaded with water and a processing aid such as an organic binder, and the knead mixture is extruded as a noodle-like strand, which is then dried and crushed to obtain formed solids, and the formed solids are calcined under an atmosphere of an oxidizing gas such as an air.

When the silicon compound is supported on the titania, examples of the silicon compound to be used include silicon alkoxyde compounds such as $Si(OR)_4$ (hereinafter R represents an alkyl group having 1 to 4 carbon atoms), silicon halides such as silicon chloride ($SiCl_4$) and silicon bromide ($SiBr_4$), silicon halide alkoxyde compounds such as $SiCl(OR)_3$, $SiCl_2(OR)_2$ and $SiCl_3(OR)$. In addition, hydrates thereof optionally may be used, or two or more selected from these silicon compounds may be used. In the present invention, the use of a silicon alkoxyde compound is preferable, and the use of a silicon tetraethoxide, i.e., a tetraethyl orthosilicate [$Si(OC_2H_5)_4$], is more preferable. The supporting method is carried out as follows: titania is impregnated with a solution of a silicon compound in an alcohol such as methanol or ethanol and/or water, or otherwise, titania is immersed in the same solution, so as to adsorb the silicon compound onto the titania.

The amount of the silicon compound to be used is usually from 0.001 to 0.3 moles, preferably from 0.004 to 0.03 moles, per one mole of titania.

In case of the above-described impregnation or immersion of the titania, the temperature therefor is usually from 0 to 100° C., preferably from 0 to 50° C., and the pressure therefor is usually from 0.1 to 1 MPa, preferably an atmospheric pressure. The impregnation or immersion of the titania may be carried out under an atmosphere of an air or an inert gas such as nitrogen, helium, argon or oxygen dioxide, which may contain a water vapor. From the viewpoint of the handling ease, the impregnation or immersion is preferably carried out under an atmosphere of the above-described inert gas.

When the silicon compound is supported on the titania, the titania, after impregnated or immersed, is usually dried and the obtained material is then calcined. As the drying method, a known method may be employed, and the temperature therefor is usually from a room temperature to about 100° C., and the pressure therefor is usually from 0.001 to 1 MPa, preferably an atmospheric pressure. Such drying may be carried out under an atmosphere of an air or an inert gas such as nitrogen, helium, argon or oxygen dioxide, which may contain a water vapor. From the viewpoint of the handling ease, the drying is preferably carried out under an atmosphere of the above-described inert gas.

The above-described calcining is preferably carried out under an atmosphere of an oxidizing gas. The oxidizing gas is a gas which contains an oxidizing material: it is, for example, an oxygen-containing gas. The oxygen concentration of the gas is usually from about 1 to about 30% by volume. As an oxygen source therefor, an air or pure oxygen is usually used, which optionally may be diluted with an inert gas or a water vapor. An air is preferably used as the oxidizing gas. The calcining temperature is usually from 100 to 1,000° C., preferably from 250 to 450° C.

The method of preparing the titania carrier in which silica is supported on titania, by heat-treating titanium halide and silicon halide may be conducted in accordance with, for example, the method disclosed in JP-A-2004-210586. Specifically, titanium halide and silicon halide gasified at 600° C. or higher is subjected to a heat treatment in the presence of oxygen and/or a water vapor of 600° C. or higher, and the resultant powder is subjected to a heat treatment at a temperature of from 300 to 600° C. to obtain powdery titania in which each titania particle has silica supported thereon. Such powdery titania may be used as carriers. Otherwise, the resultant titania is similarly formed and calcined by a known method for use as carriers. Above all, the calcined titania is preferably used. As the titanium halide, titanium chloride ($TiCl_4$) is preferably used. As the silicon halide, silicon chloride ($SiCl_4$) is preferably used.

The amount of the silicon halide is usually from 0.001 to 0.3 moles, preferably from 0.004 to 0.03 moles, per one mole of titanium halide.

In the present invention, the ratio of silica supported on and coating the titania carrier can be expressed as a surface coverage $\theta$ of a silica monomolecular layer to the specific surface area of the titania carrier, and can be calculated by the following equation (2):

$$\theta = a_m \times A/S \times 100 \qquad (2)$$

$\theta$: a monomolecular layer surface coverage [%]
S: a specific surface area [$m^2/g$] of a titania carrier in which silica is supported on titania
A: a number of silica molecules supported on 1 g of the titania carriers
$a_m$: a silica molecular cross-sectional area [$=0.139 \times 10^{-18}$ [$m^2$]]

The silica molecule-occupying area $a_m$ can be calculated by the following equation (3):

$$a_m = 1.091(M_w/(Nd))^{2/3} \qquad (3)$$

$M_w$: a molecular weight of silica [$=60.07$ [g/mol]]
N: Avogadro number [$=6.02 \times 10^{23}$]
d: a true density of silica [$=2.2$ [$g/m^3$]]

The above-described monomolecular layer surface coverage $\theta$ is usually from 10 to 200%, preferably from 20 to 120%. In other words, the amount of the silicon compound or the like to be used should be appropriately controlled so as to obtain such a value in the preparation of the titania carrier. When the monomolecular layer surface coverage $\theta$ is too low, titania or ruthenium oxide of the ruthenium oxide-supported material obtained after calcining tends to sinter, and thus, the thermal stability of the ruthenium oxide-supported material tends to be lower. When it is too high, it becomes hard for the titania to support a ruthenium compound thereon, and the catalytic activity of the resultant ruthenium oxide-supported material is likely to be lower.

Thus, the titania carrier in which silica is supported on titania can be obtained. Then, this titania carrier is allowed to support a ruthenium compound thereon. Sintering of titania and ruthenium oxide of the resultant ruthenium oxide-supported material can be sufficiently suppressed by allowing the above-specified carrier to support the ruthenium compound thereon, with the result that the thermal stability of the ruthenium oxide-supported material can be improved. Examples of the ruthenium compound herein referred to include halides such as $RuCl_3$ and $RuBr_3$, halogeno salts such as $K_3RuCl_6$ and $K_2RuCl_6$, oxo salts such as $K_2RuO_4$, oxy halides such as $Ru_2OCl_4$, $Ru_2OCl_5$ and $Ru_2OCl_6$, halogeno complexes such as $K_2[RuCl_5(H_2O)_4]$, $[RuCl_2(H_2O)_4]Cl$, $K_2[Ru_2OCl_{10}]$ and $Cs_2[Ru_2OCl_4]$, ammine complexes such as $[Ru(NH_3)_5H_2O]Cl_2$, $[Ru(NH_3)_5Cl]Cl_2$, $[Ru(NH_3)_6]Cl_2$, $[Ru(NH_3)_6]Cl_3$ and $[Ru(NH_3)_6]Br_3$, carbonyl complexes such as $Ru(CO)_5$ and $Ru_3(CO)_{12}$, carboxylato complexes such as $[Ru_3O(OCOCH_3)_6(H_2O)_3]OCOCH_3$, $[RU_2(OCOR)_4]Cl$ (R=an alkyl group having 1 to 3 carbon atoms), nitrosyl complexes such as $K_2[RuCl_5(NO)]$, $[Ru(NH_3)_5(NO)]Cl_3$, $[Ru(OH)(NH_3)_4(NO)](NO_3)_2$ and $[Ru(NO)](NO_3)_3$, phosphine complexes, amine complexes and acetylacetonato complexes. Among those, the halides are preferable, and the chlorides are particularly preferable. As the ruthenium compound, a hydrate of the ruthenium compound optionally may be used; or otherwise, two or more selected from the above ruthenium compounds may be used.

The following is employed as the method of allowing the ruthenium compound to be supported on the titania carrier in which silica is supported on titania: the carrier is impregnated with a solution of the ruthenium compound, or the carrier is immersed in a solution of the ruthenium compound, so that the ruthenium compound is adsorbed onto the carrier. If needed, a reducing treatment as described in, for example, U.S. Pat. No. 6,852,667 or WO01/10550 may be carried out after the ruthenium compound has been supported on the carrier.

The ratio of the ruthenium compound to the titania carrier is appropriately selected so that the weight ratio of the ruthenium oxide to the titania carrier in the ruthenium oxide-supported material obtained after the calcining can be usually from 0.1/99.9 to 20/80, preferably from 0.3/99.5 to 10/85, more preferably from 0.5/99.5 to 5/95. When the ratio of the ruthenium oxide is too small, the catalytic activity of the resultant ruthenium oxide-supported material is likely to be insufficient. When the ratio thereof is too large, it may be disadvantageous in view of cost-effectiveness. In addition, it is preferable to control the amount of the ruthenium compound so that the ruthenium oxide in the ruthenium oxide-supported material can be from 0.1 to 4 moles, preferably from 0.3 to 2 moles, per one mole of silica supported on the titania carrier. When the number of moles of the ruthenium oxide per one mole of silica is too large, the thermal stability of the resultant ruthenium oxide-supported material may become lower. When it is too small, the catalytic activity of the resultant ruthenium oxide-supported material may be lower.

The ruthenium compound is supported on the titania carrier and the obtained material is then calcined under an atmosphere of an oxidizing gas. The ruthenium compound supported on the titania carrier is converted into a ruthenium oxide by this calcining. The oxidizing gas is a gas containing an oxidizing substance, for example, an oxygen-containing gas. The oxygen concentration of the gas is usually from about 1 to about 30% by volume. As an oxygen source therefor, an air or pure oxygen is usually used, and optionally may be diluted with an inert gas. An air is especially preferable as the oxidizing gas. The calcining temperature is usually from 100 to 500° C., preferably from 200 to 350° C.

The ruthenium oxide-supported material is obtained after the calcining. The oxidation number of ruthenium in the ruthenium oxide-supported material is usually +4, and the ruthenium oxide is usually ruthenium dioxide ($RuO_2$), and may contain ruthenium of other oxidation number or ruthenium oxide in other form.

The ruthenium oxide-supported material thus produced is used as a catalyst. Chlorine can be efficiently produced by oxidizing hydrogen chloride with oxygen in the presence of this catalyst. The reaction system may be of fixed bed type or fluidized bed type. Particularly, a gas phase reaction of a fixed bed gas phase flow system or a fluidized bed gas phase flow system is advantageously employed.

This oxidization reaction is an equilibrium reaction, which is preferably carried out at a relatively low temperature, since the oxidization reaction at an excessively high temperature decreases an equilibrium conversion. The reaction temperature is usually from 100 to 500° C., preferably from 200 to 450° C. The reaction pressure is usually from about 0.1 to about 5 MPa. As the oxygen source, either an air or pure oxygen may be used. The theoretical molar amount of oxygen relative to hydrogen chloride is ¼ mole. However, in general, oxygen in an amount 0.1 to 10 times larger than this theoretical amount is used. The feeding rate of hydrogen chloride is a gas-feeding rate (L/h; conversion at 0° C. under one atmospheric pressure) per 1 L of a catalyst. That is, the feeding rate is usually from about 10 to about 20,000 $h^{-1}$ in terms of GHSV.

EXAMPLES

Hereinafter, Examples of the present invention will be illustrated, however, are not construed as limiting the scope of the present invention in any way. Parts and %, i.e., the units of amounts and contents, used in Examples, are based on weights, unless otherwise specified. In Examples, the ratios of the rutile titania to the titania carriers were determined by the XRD analysis, and the contents of sodium and calcium relative to the carriers in the titania carriers were determined by the ICP analysis.

Example 1

Preparation of Carrier

Titania powder [F-1R, manufactured by Showa Titanium; rutile titania ratio: 93%] (100 parts) was mixed with an organic binder [YB-152A manufactured by YUKEN INDUSTRY CO., LTD.] (2 parts), and the mixture was then admixed and kneaded with pure water (29 parts) and a titania sol [CSB manufactured by Sakai Chemical Industry Co., Ltd.; titania content: 40%] (12.5 parts). The resulting mixture was extruded to obtain a noodle-like strand with a diameter of 3.0 mmφ, which was dried at 60° C. for 2 hours and was then crushed into formed solids with lengths of from about 3 to about 5 mm. The resultant formed solids were heated in an air from a room temperature to 600° C. in 1.7 hours, and were then maintained at the same temperature for 3 hours for calcining. Further, 20.0 g of the calcined solids were impregnated with a solution of tetraethyl orthosilicate [$Si(OC_2H_5)_4$ manufactured by Wako Pure Chemical Industries, Ltd.] (0.708 g) in ethanol (2.90 g) and were then left to stand alone under an atmosphere of an air at 24° C. for 15 hours. The resultant solids (20.1 g) were heated from a room temperature to 300° C. in 0.8 hours under a stream of an air and were then maintained at the same temperature for 2 hours for calcining. Thus, a white titania carrier (20.0 g) having a silica content of 1.0% [rutile titania ratio: 90% or more; sodium content: 12 ppm by weight; and calcium content: 8 ppm by weight] was obtained. The specific surface area of the carrier and the monomolecular layer surface coverage calculated from the silica content are shown in Table 1.

(Production of Ruthenium Oxide-Supported Material)

The above-obtained titania carrier was impregnated with an aqueous solution of ruthenium chloride hydrate [RuCl$_3$.nH$_2$O manufactured by N.E. CHEMCAT; Ru content: 40.0%] (0.486 g) in pure water (4.56 g), and was then left to stand at 24° C. under an atmosphere of an air for 15 hours. The resultant solid (20.9 g) was heated from a room temperature to 250° C. in 1.3 hours under a stream of an air and was then maintained at the same temperature for 2 hours for calcining. Thus, a bluish grey ruthenium oxide-supported material (20.9 g) having a ruthenium oxide content of 1.25% was obtained.

(Evaluation of Initial Activity of Ruthenium Oxide-Supported Material)

The ruthenium oxide-supported material (1.0 g) thus obtained was diluted with α-alumina balls with diameters of 2 mm [SSA995 manufactured by NIKKATO CORPORATION] (12 g), and the diluted ruthenium oxide-supported material was charged in a nickel-made reaction tube (with an inner diameter of 14 mm). α-Alumina balls (12 g) of the same kind as above for use as a pre-heating layer was further charged in the gas inlet side of the reaction tube. In this reaction tube, a hydrogen chloride gas and an oxygen gas were fed at a rate of 0.214 mol/h (4.8 L/h as a result of conversion at 0° C. under one atmospheric pressure) and at a rate of 0.107 mol/h (2.4 L/h as a result of conversion at 0° C. under one atmospheric pressure), respectively. The catalyst layer was heated to a temperature of from 282 to 283° C. before a reaction. At a point of time when 1.5 hours had passed since the start of the reaction, the gas from the outlet of the reaction tube was allowed to flow into an aqueous 30% potassium iodide solution for sampling for 20 minutes. Then, the amount of produced chlorine was measured by the iodometric titration method to determine a chlorine-producing rate (mol/h). A conversion of hydrogen chloride was calculated from this chlorine-producing rate and the above-described hydrogen chloride-feeding rate, by the following equation, and the result is shown in Table 1:

Conversion of hydrogen chloride (%)=[a chlorine-producing rate (mol/h)×2÷a hydrogen chloride-feeding rate (mol/h)]×100

(Thermal Stability Test on Ruthenium Oxide-Supported Material)

The ruthenium oxide-supported material (1.2 g) thus obtained was charged in a quartz-made reaction tube (with an inner diameter of 21 mm). In this reaction tube, a hydrogen chloride gas, an oxygen gas, a chlorine gas and a water vapor were fed under an atmospheric pressure, at a rate of 0.086 mol/h (1.9 L/h as a result of conversion at 0° C. under one atmospheric pressure), at a rate of 0.075 mol/h (1.7 L/h as a result of conversion at 0° C. under one atmospheric pressure), at a rate of 0.064 mol/h (1.4 L/h as a result of conversion at 0° C. under one atmospheric pressure) and at a rate of 0.064 mol/h (1.4 L/h as a result of conversion at 0° C. under one atmospheric pressure), respectively. The catalyst layer was heated to a temperature of from 375 to 380° C. before a reaction. At a point of time when 50 hours had passed since the start of the reaction, the reaction was stopped, and the reaction product was cooled while a nitrogen gas being fed at a rate of 0.214 mol/h (4.8 L/h as a result of conversion at 0° C. under one atmospheric pressure).

(Evaluation of Activity of Ruthenium Oxide-Supported Material after Thermal Stability Test)

The ruthenium oxide-supported material subjected to the above-described thermal stability test (1.0 g out of total 1.2 g) was taken out, and a conversion of hydrogen chloride was determined by the same method as in the above-described evaluation of the initial performance, and the result is shown in Table 1.

Example 2

Preparation of Carrier and Production of Ruthenium Oxide-Supported Material and Evaluation Thereof A ruthenium oxide-supported material was produced in the same manners as in Example 1, except that the silica content of the carrier was changed to be 0.65%. A monomolecular layer surface coverage was calculated from the specific surface area of the titania carrier and the silica content, and the result is shown in Table 1. An initial activity evaluation, a thermal stability test and an activity evaluation after the test were conducted on the resultant ruthenium oxide-supported material in the same manners as in Example 1. The results are shown in Table 1.

Example 3

Preparation of Carrier and Production of Ruthenium Oxide-Supported Material and Evaluation Thereof A ruthenium oxide-supported material was produced in the same manners as in Example 1, except that the ruthenium oxide content of the material was changed to 2.0%. A monomolecular layer surface coverage was calculated from the specific surface area of the titania carrier and the silica content, and the result is shown in Table 1. An initial activity evaluation, a thermal stability test and an activity evaluation after the test were conducted on the resultant ruthenium oxide-supported material in the same manners as in Example 1. The results are shown in Table 1.

Example 4

Preparation of Carrier and Production of Ruthenium Oxide-Supported Material and Evaluation Thereof A ruthenium oxide-supported material was produced in the same manners as in Example 1, except that the carrier was impregnated with a solution of tetraethyl orthosilicate in ethanol and was then left to stand at 24° C. under a nitrogen atmosphere for 15 hours. A monomolecular layer surface coverage was calculated from the specific surface area of the titania carrier and the silica content, and the result is shown in Table 1. An initial activity evaluation, a thermal stability test and an activity evaluation after the test were conducted on the resultant ruthenium oxide-supported material in the same manners as in Example 1. The results are shown in Table 1.

Example 5

Preparation of Carrier

In accordance with the method described in JPA-2004-210586, powder (100 parts) [F-1S manufactured by Showa Titanium; rutile titania ratio: 38%], obtained by subjecting titanium chloride (279 parts) and silicon chloride (1.0 part) to a heat treatment, was mixed with an organic binder (2 parts)

[YB-152A manufactured by YUKEN INDUSTRY CO., LTD.], and the mixture was admixed and kneaded with pure water (29 parts) and a titania sol (12.5 parts) [CSB manufactured by Sakai Chemical Industry Co., Ltd.; titania content: 40%]. This mixture was extruded to obtain a noodle-like strand with a diameter of 3.0 mϕ, which was then dried at 60° C. for 2 hours and was then crushed into formed solid materials with lengths of from 3 to 5 mm. The resultant formed solid materials were heated from a room temperature to 600° C. in 1.7 hours and were then maintained at the same temperature for 3 hours for calcining. Thus, a white titania carrier having a silica content of 0.3% [rutile titania ratio: 35%; sodium content: 11 ppm by weight; and calcium content: 7 ppm by weight) was obtained. A monomolecular layer surface coverage calculated from the specific surface area of the carrier and the silica content is shown in Table 1.

(Production and Evaluation of Ruthenium Oxide-Supported Material)

The above-obtained titania carrier (10.0 g) was impregnated with an aqueous solution of ruthenium chloride hydrate [$RuCl_3.nH_2O$ manufactured by N.E. CHEMCAT; Ru content: 40.0%] (0.241 g) in pure water (2.40 g) and was then left to stand at 24° C. for 15 hours. The resultant solid (10.5 g) was heated from a room temperature to 250° C. in 1.3 hours under a stream of an air and was then maintained at the same temperature for 2 hours for calcining. Thus, a bluish grey ruthenium oxide-supported material (10.5 g) was obtained. An initial activity evaluation, a thermal stability test and an activity evaluation after the test were conducted on the resultant ruthenium oxide-supported material in the same manners as in Example 1. The results are shown in Table 1.

Comparative Example 1

Preparation of Carrier

Titania powder (100 parts) [F-1R manufactured by Showa Titanium; rutile titania ratio: 93%] was mixed with an organic binder (2 parts) [YB-152A manufactured by YUKEN INDUSTRY CO., LTD.], and the mixture was admixed and kneaded with pure water (29 parts) and a titania sol (12.5 parts) [CSB manufactured by Sakai Chemical Industry Co., Ltd.; titania content: 40%]. This mixture was extruded to obtain a noodle-like strand with a diameter of 3.0 mmϕ, which was then dried at 60° C. for 2 hours and crushed into formed solid materials with lengths of from 3 to 5 mm. The resultant formed solid materials were heated from a room temperature to 600° C. in 1.7 hours in an air and were then maintained at the same temperature for 3 hours for calcining. Thus, a white titania carrier [rutile titania ratio: 90% or more; sodium content: 12 ppm by weight; and calcium content: 8 ppm by weight) was obtained. The specific surface area of the carrier is shown in Table 1.

(Production and Evaluation of Ruthenium Oxide-Supported Material)

The above-obtained titania carrier (10.0 g) was impregnated with an aqueous solution of ruthenium chloride hydrate [$RuCl_3.nH_2O$ manufactured by N.E. CHEMCAT; Ru content: 40.0%] (0.241 g) in pure water (2.35 g), and was then left to stand at 24° C. under an atmosphere of an air for 15 hours. The resultant solid (10.1 g) was heated from a room temperature to 250° C. in 1.3 hours under a stream of an air and was then maintained at the same temperature for 2 hours for calcining. Thus, a bluish grey ruthenium oxide-supported material (9.9 g) was obtained. An initial activity evaluation, a thermal stability test and an activity evaluation after the test were conducted on the resultant ruthenium oxide-supported material in the same manners as in Example 1. The results are shown in Table 1.

Comparative Example 2

Preparation of Carrier

A titania carrier [rutile titania ratio: 90% or more; sodium content: 12 ppm by weight; and calcium content: 8 ppm by weight) was prepared in the same manners as in Comparative Example 1. The specific surface area of the carrier is shown in Table 1.

(Production and Evaluation of Ruthenium Oxide-Supported Material)

The above-obtained titania carrier (10.0 g) was impregnated with a solution of tetraethyl orthosilicate [$Si(OC_2H_5)_4$ manufactured by Wako Pure Chemical Industries, Ltd.] (0.228 g) and ruthenium chloride hydrate [$RuCl_3.nH_2O$ manufactured by N.E. CHEMCAT; Ru content: 40.0%] (0.242 g) in ethanol (1.72 g) and was then left to stand at 24° C. under an atmosphere of an air for 15 hours. The resultant solid (10.5 g) was heated from a room temperature to 300° C. in 0.8 hour under a stream of an air and was then maintained at the same temperature for 2 hours for calcining. Thus, a ruthenium oxide-supported material (10.2 g) having a silica content of 0.65% and a ruthenium oxide content of 1.25% was obtained. An initial activity evaluation, a thermal stability test and an activity evaluation after the test were conducted on the resultant ruthenium oxide-supported material in the same manners as in Example 1. The results are shown in Table 1. In this regard, a silica monomolecular layer surface coverage [i.e., a value found when S in the equation (2) is the specific surface area of the ruthenium oxide-supported material] to the ruthenium oxide-supported material after having supported silica thereon was determined. The result is shown in Table 1.

Comparative Example 3

Preparation of Carrier and Production and Evaluation of Ruthenium Oxide-Supported Material A ruthenium oxide-supported material was produced referring to Example 1 of JP-A-2002-292279. That is, a titania carrier [rutile titania ratio: 90% or more; sodium content: 12 ppm by weight; and calcium content: 8 ppm by weight] (20.0 g) prepared in the same manner as in Comparative Example 1 was impregnated with an aqueous solution of ruthenium chloride hydrate [$RuCl_3.nH_2O$ manufactured by N.E. CHEMCAT; Ru content: 40.0%] (0.480 g) in pure water (3.73 g), and was then left to stand at 24° C. for 15 hours. The resultant solid (20.2 g) was heated from a room temperature to 220° C. in 0.6 hour under a stream of hydrogen at a rate of 0.054 mol/h (1.9 L/h as a result of a conversion at 0° C. under one atmospheric pressure) and was then maintained at the same temperature for one hour for reduction. Thus, a grey ruthenium oxide-supported material (20.1 g) was obtained. The resultant ruthenium oxide-supported material (5.0 g out of total) was taken out and was then impregnated with a solution of tetraethyl orthsilicate (0.052 g) [$Si(OC_2H_5)_4$ manufactured by Wako Pure Chemical Industries, Ltd.] in ethanol (0.79 g) and was then left to stand at 24° C. for 15 hours under an atmosphere of an air. The resultant solid (5.1 g) was heated from a room temperature to 300° C. in 0.8 hour under a stream of an air, and was then maintained at the same temperature for 2 hours for calcining. Thus, a ruthenium oxide-supported material (5.1 g) having a silica content of 0.32% and a ruthenium oxide content of 1.25% was obtained. An initial activity evaluation, a thermal stability test and an activity evaluation after the test were conducted on the resultant ruthenium oxide-supported material in the same manners as in Example 1. The results are shown in Table 1. In this regard, a silica monomolecular layer surface coverage to the ruthenium oxide-supported material after having supported silica thereon was determined in the same manner as in Comparative Example 2. The result is shown in Table 1.

TABLE 1

|  |  | Ex. 1 | Ex. 2 | Ex. 3 | Ex. 4 | Ex. 5 |
|---|---|---|---|---|---|---|
|  | Summary | Tetraethyl orthosilicate supported on titania | | | | Carrier prepared from titanium chloride and silicon chloride |
| Titania carrier | Specific surface area [m²/g] | 17.2 | 16.1 | 17.2 | 14.9 | 21.7 |
|  | Ratio of rutile titania [%] | ≧90 | ≧90 | ≧90 | ≧90 | 35 |
|  | Sodium content [ppm] | 12 | 12 | 12 | 12 | 11 |
|  | Calcium content [ppm] | 8 | 8 | 8 | 8 | 7 |
|  | Silica content [%] | 1.0 | 0.65 | 1.0 | 1.0 | 0.3 |
|  | Monomolecular layer surface coverage θ [%] | 81 | 56 | 81 | 93 | 19 |
| Ruthenium oxide-supported material | Ruthenium oxide content [%] | 1.25 | 1.24 | 2.0 | 1.25 | 1.25 |
| Result of reaction | Conversion [%] of hydrogen chloride Initial: A | 7.3 | 8.8 | 9.2 | 7.2 | 9.3 |
|  | Conversion [%] of hydrogen chloride After thermal stability test: B | 8.0 | 8.3 | 9.7 | 7.3 | 9.1 |
|  | B/A | 1.10 | 0.94 | 1.05 | 1.01 | 0.98 |

|  |  | C. Ex. 1 | C. Ex. 2 | C. Ex. 3 |
|---|---|---|---|---|
|  | Summary | No silicon compound used | Carrier impreganated with both of ethyl orthosilicate and ruthenium chloride | Carrier having ruthenium chloride supported thereon, followed by silicon compound |
| Titania carrier | Specific surface area [m²/g] | 16.1 | 16.7 | 15.8 |
|  | Ratio of rutile titania [%] | ≧90 | ≧90 | ≧90 |
|  | Sodium content [ppm] | 12 | 12 | 12 |
|  | Calcium content [ppm] | 8 | 8 | 8 |
|  | Silica content [%] | — | (0.65) | (0.32) |
|  | Monomolecular layer surface coverage θ [%] | — | (54) | (28) |
| Ruthenium oxide-supported material | Ruthenium oxide content [%] | 1.25 | 1.25 | 1.25 |
| Rusult of reaction | Conversion [%] of hydrogen chloride Initial: A | 10.9 | 6.8 | 7.4 |
|  | Conversion [%] of hydrogen chloride After thermal stability test: B | 5.3 | 6.0 | 6.7 |
|  | B/A | 0.49 | 0.88 | 0.91 |

In Table 1, the silica contents and the monomolecular layer surface coverages of Comparative Examples 2 and 3 indicate the values of the ruthenium oxide-supported materials which had silica supported thereon.

INDUSTRIAL APPLICABILITY

According to the present invention, a ruthenium oxide-supported material excellent in thermal stability and catalytic lifetime can be produced, and chlorine can be produced by oxidizing hydrogen chloride with oxygen, using the resultant ruthenium oxide-supported material as a catalyst.

The invention claimed is:

1. A process for producing a ruthenium oxide-supported material, comprising a ruthenium compound on a titania carrier in which silica is supported on titania, and then calcining the obtained material under an atmosphere of an oxidizing gas.

2. The process of claim 1, wherein the titania carrier in which silica is supported on titania is prepared by supporting a silicon compound on the titania, and calcining the silicon compound on the titania under an atmosphere of an oxidizing gas, and wherein the titania carrier is allowed to support the ruthenium compound thereon.

3. The process of claim 2, wherein the silicon compound is a silicon alkoxide compound.

4. The process of claim 2, wherein the silicon compound is tetraethyl orthosilicate.

5. The process of claim 1, wherein a gaseous titanium halide and a gaseous silicon halide tare subjected to a heat treatment under an atmosphere of an oxidizing gas to prepare the titania carrier in which silica is supported on titania, and wherein the titania carrier is allowed to support the ruthenium compound thereon.

6. The process of any one of claims 1 to 5, wherein a surface coverage of a silica monomolecular layer to the specific surface area of the titania carrier is from 10 to 120%.

7. The process of any one of claims 1 to 5, wherein the sodium content in the titania carrier is 200 ppm by eight or less.

8. The process of any One of claims 1 to 5, wherein the calcium content in the titania carrier is 200 ppm by weight or less.

9. The process of any one of claims 1 to 5, wherein the ratio of a rutile titania to total of the ruffle titania and an anatase titania in the titania carrier is 20% or more.

10. The process according to claim 1, wherein the titania of the titania carrier is a rutile titania, an anatase titania, an amorphous titania or a mixture thereof.

* * * * *